US012724539B2

(12) United States Patent
Kang et al.

(10) Patent No.: US 12,724,539 B2
(45) Date of Patent: Sep. 1, 2026

(54) STORAGE CONTROLLER MANAGING DIFFERENT TYPES OF BLOCKS, OPERATING METHOD THEREOF, AND OPERATING METHOD OF STORAGE DEVICE INCLUDING THE SAME

(71) Applicant: Samsung Electronics Co., Ltd., Suwon-si (KR)

(72) Inventors: Ilkueon Kang, Suwon-si (KR); Eunji Kang, Suwon-si (KR); Seokyoung Ko, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/058,546

(22) Filed: Nov. 23, 2022

(65) Prior Publication Data

US 2023/0236737 A1 Jul. 27, 2023

(30) Foreign Application Priority Data

Jan. 26, 2022 (KR) ........................ 10-2022-0011494
May 26, 2022 (KR) ........................ 10-2022-0064866

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
None
See application file for complete search history.

(56) References Cited

U.S. PATENT DOCUMENTS 7,676,626 B2 3/2010 Lee et al.
8,078,794 B2 12/2011 Lee et al.
8,788,908 B2 7/2014 Yoon et al.
9,122,592 B2 9/2015 Cheon et al.
9,679,659 B2 * 6/2017 Shim .................. G11C 11/5635
10,996,863 B1 5/2021 Kuzmin et al.
11,327,681 B2 5/2022 Shin et al.
(Continued)

FOREIGN PATENT DOCUMENTS

KR 100771521 B1 10/2007
KR 20210079394 A 6/2021
(Continued)

*Primary Examiner* — Jared I Rutz
*Assistant Examiner* — Elias Young Kim
(74) *Attorney, Agent, or Firm* — Harness, Dickey & Pierce, P.L.C.

(57) ABSTRACT

Disclosed is an operating method of a storage controller which communicates with a host and a non-volatile memory device. The method includes receiving a first request indicating a first zone of a plurality of zones from the host, setting a state of the first zone to an active state in response to the first request, assigning a first memory block of a plurality of memory blocks of the non-volatile memory device to the first zone updated to the active state, and storing user data corresponding to the first request in the first memory block. The first memory block is higher in reliability than a second memory block assigned to a second zone having a non-active state from among the plurality of zones, and the storage controller supports a zoned namespace (ZNS) standard of a NVM express.

20 Claims, 14 Drawing Sheets

(56) References Cited

U.S. PATENT DOCUMENTS

2010/0100678 A1* 4/2010 Kobayashi ............ G06F 3/0647 711/170
2013/0234936 A1* 9/2013 Urakawa ............. G06F 3/04883 345/157
2020/0118585 A1* 4/2020 Gerhart ................. G06F 3/0659
2020/0151054 A1* 5/2020 Shin .................... G06F 11/1048
2020/0409589 A1 12/2020 Bennett et al.
2021/0055990 A1* 2/2021 Iwasaki ............... G06F 11/1068
2021/0089217 A1 3/2021 Bjorling et al.
2021/0132827 A1* 5/2021 Helmick ............... G06F 3/0614
2021/0182166 A1 6/2021 Hahn et al.
2021/0240346 A1 8/2021 Bernat et al.
2021/0263674 A1 8/2021 Shin et al.
2021/0303188 A1 9/2021 Bazarsky et al.
2021/0318801 A1* 10/2021 Benisty ................. G06F 3/0604
2021/0318820 A1* 10/2021 Jin .......................... G06F 3/061
2021/0397562 A1 12/2021 Bhardwaj
2022/0075551 A1* 3/2022 Alhussien ............. G06F 3/0649
2022/0113885 A1* 4/2022 Jeon .................... G06F 12/0246
2022/0137858 A1* 5/2022 Lee ....................... G06F 3/0604 711/154
2022/0261160 A1* 8/2022 Sun ....................... G06F 3/0644
2022/0269440 A1* 8/2022 Lin ....................... G06F 3/0604
2023/0129727 A1* 4/2023 Kim ...................... G06F 3/0634 711/154
2023/0161712 A1* 5/2023 Bhardwaj ............... G06F 12/10 711/206

FOREIGN PATENT DOCUMENTS

KR 10-2021-0108107 A 9/2021
KR 20210125774 A 10/2021

* cited by examiner 110
120
118
Non-Volatile Memory Interface Circuit
116
Processor
115
ROM
114
Volatile Memory Device
Buffer Memory (114a)
113
BLK Assignment Unit
112
Zone State Manager
111
ZNS Table
117
Host Interface Circuit
11

1st Zone
2nd Zone
3rd Zone
...
N-th Zone
LBA1
LBA2
...
LBAm
Logical Region
Physical Region
T1_BLK1
T1_BLK2
...
T1_BLKm
(Sequentially addressed)
T1_BLK
1st Zone
2nd Zone
N-th Zone
Non-Volatile Memory Device (120)

FIG. 4

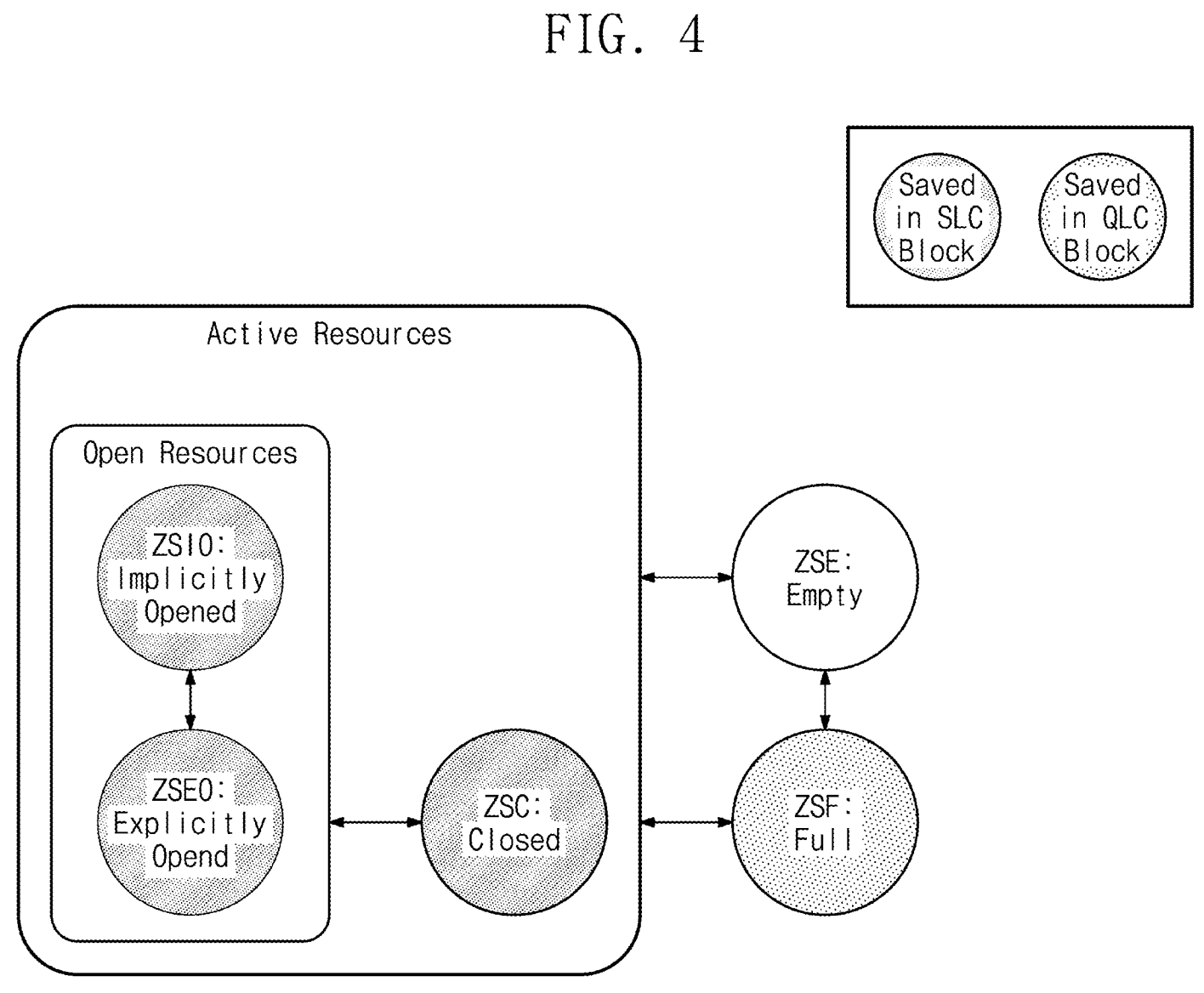

Saved in SLC Block

Saved in QLC Block

ZSE: Empty

ZSF: Full

Active Resources

ZSC: Closed

Open Resources

ZSIO: Implicitly Opened

ZSEO: Explicitly Opend

ZNS Table

| Zone Number | State | BLK Assignment |
| --- | --- | --- |
| Z1 | Full | BLK6 |
| Z2 | Full | BLK7 |
| Z3 | Full | BLK8 |
| Z4 | Full | BLK9 |
| Z5(target) | Empty -> Active | None -> BLK1 |

11

① Receive RQ1

112

Zone State Manager

② Update the state information of Z5

③ Request an assignment

113

BLK Assignment Unit

④ Assign BLK1 to Z5 and update the BLK assignment info of Z5

11

114a

Buffer Memory

⑤ Request to process RQ1

⑥ Store target data to BLK1

120

Non-Volatile Memory Device

T1_BLK BLK1 BLK2 BLK3 BLK4 BLK5

T2_BLK BLK6 BLK7 BLK8 BLK9 BLK10

ZNS Table

| Zone Number | State | BLK Assignment |
|---|---|---|
| Z1 | Full | BLK6 |
| Z2 | Full | BLK7 |
| Z3 | Full | BLK8 |
| Z4 | Full | BLK9 |
| Z5(target) | Active -> Full | BLK1 -> BLK10 |

① Receive RQ2

112 Zone State Manager

② Update the state of Z5

③ Request an assignment

113 BLK Assignment Unit

④ Assign BLK10 to Z5 and update the BLK assignment info of Z5

⑤ Request to process RQ2

114a Buffer Memory

⑥ Move target data from BLK1 to BLK10

120 Non-Volatile Memory Device

T1_BLK: BLK1 BLK2 BLK3 BLK4 BLK5

T2_BLK: BLK6 BLK7 BLK8 BLK9 BLK10

ZNS Table

| Zone Number | State | BLK Assignment |
|---|---|---|
| Z1 | Full | BLK6 |
| Z2 | Full | BLK7 |
| Z3 | Full | BLK8 |
| Z4 | Full | BLK9 |
| Z5(target) | Active -> Empty | BLK1 -> None |

① Receive RQ3

② Update the state of Z5

③ Request an assignment

④ De-assign BLK1 and update the BLK assignment info of Z5

⑤ Request to process RQ3

⑥ Delete target data from BLK1

112 Zone State Manager

113 BLK Assignment Unit

114a Buffer Memory

120 Non-Volatile Memory Device

T1_BLK BLK1 BLK2 BLK3 BLK4 BLK5

T2_BLK BLK6 BLK7 BLK8 BLK9 BLK10

STORAGE CONTROLLER MANAGING DIFFERENT TYPES OF BLOCKS, OPERATING METHOD THEREOF, AND OPERATING METHOD OF STORAGE DEVICE INCLUDING THE SAME

CROSS-REFERENCE TO RELATED APPLICATIONS

This application claims priority under 35 U.S.C. § 119 to Korean Patent Application Nos. 10-2022-0011494 filed on Jan. 26, 2022, and 10-2022-0064866 filed on May 26, 2022, in the Korean Intellectual Property Office, the disclosures of which are incorporated by reference herein in their entireties.

BACKGROUND

Example embodiments of the inventive concepts described herein relate to a storage controller, and more particularly, relate to a storage controller managing different types of blocks.

A memory device stores data in response to a write request and outputs data stored therein in response to a read request. For example, the memory device is classified as a volatile memory device, which loses data stored therein when a power supply is interrupted, such as a dynamic random access memory (DRAM) device, a static RAM (SRAM) device, or a non-volatile memory device, which retains data stored therein even when a power supply is interrupted, such as a flash memory device, a phase-change RAM (PRAM), a magnetic RAM (MRAM), or a resistive RAM (RRAM).

In general, the non-volatile memory device may store data depending on a random access. The random access accompanies a frequent garbage collection operation for the entire region, thereby causing a decrease in the lifetime of a storage device. As a large over provisioning (OP) region is assigned for frequent garbage collection, wear leveling, and bad block management, an available storage capacity of the storage device may be decreased. To reduce or prevent the above issue, there may be a technique for dividing memory blocks of the non-volatile memory device into zones and sequentially storing related data within a zone.

SUMMARY

Example embodiments of the inventive concepts provide a storage controller managing different types of blocks, an operating method thereof, and an operating method of a storage device including the same.

According to some example embodiments, an operating method of a storage controller which communicates with a host and a non-volatile memory device includes receiving a first request indicating a first zone of a plurality of zones from the host, setting a state of the first zone to an active state in response to the first request, assigning a first memory block of a plurality of memory blocks of the non-volatile memory device to the first zone updated to the active state, and storing user data corresponding to the first request in the first memory block. The first memory block is higher in reliability than a second memory block assigned to a second zone having a non-active state from among the plurality of zones, and the storage controller supports a zoned namespace (ZNS) standard of a NVM express.

According to some example embodiments, a storage controller includes processing circuitry configured to change a state of a target zone of a plurality of zones depending on a request of a host, assign a first memory block of a plurality of memory blocks in a non-volatile memory device to the target zone in response to the changed state of the target zone being an active state, and a buffer memory configured to store target data corresponding to the request of the host in the first memory block. The storage controller supports a zoned namespace (ZNS) standard of a NVM express, and the first memory block is higher in reliability than a second memory block assigned to a zone having a non-active state from among the plurality of zones.

According to some example embodiments, an operating method of a storage device which communicates with a host includes receiving a first request indicating a first zone of a plurality of zones from the host, setting a state of the first zone to an active state in response to the first request, assigning a first memory block of a plurality of memory blocks of a non-volatile memory device to the first zone updated to the active state, and storing user data corresponding to the first request in the first memory block. The first memory block is higher in reliability than a second memory block assigned to a second zone having a non-active state from among the plurality of zones, and the storage controller supports a zoned namespace (ZNS) standard of a NVM express.

BRIEF DESCRIPTION OF THE FIGURES

The above and other objects and features of the inventive concepts will become apparent by describing in detail some example embodiments thereof with reference to the accompanying drawings.

FIG. 4 is a diagram describing states of a zone, according to some example embodiments of the inventive concepts.

FIG. 5 is a diagram describing an operating method of a storage device of FIG. 1, according to some example embodiments of the inventive concepts.

FIG. 8 is a diagram describing an operating method of a storage device of FIG. 1, according to some example embodiments of the inventive concepts.

FIG. 11 is a diagram describing an operating method of a storage device of FIG. 1, according to some example embodiments of the inventive concepts.

DETAILED DESCRIPTION

Below, some example embodiments of the inventive concepts will be described in detail and clearly to such an extent that one skilled in the art easily carries out the inventive concepts. With regard to the description of the inventive concepts, to make the overall understanding easy, like components will be marked by like reference signs/numerals in drawings, and thus, additional description will be omitted to avoid redundancy.

Figure 1:
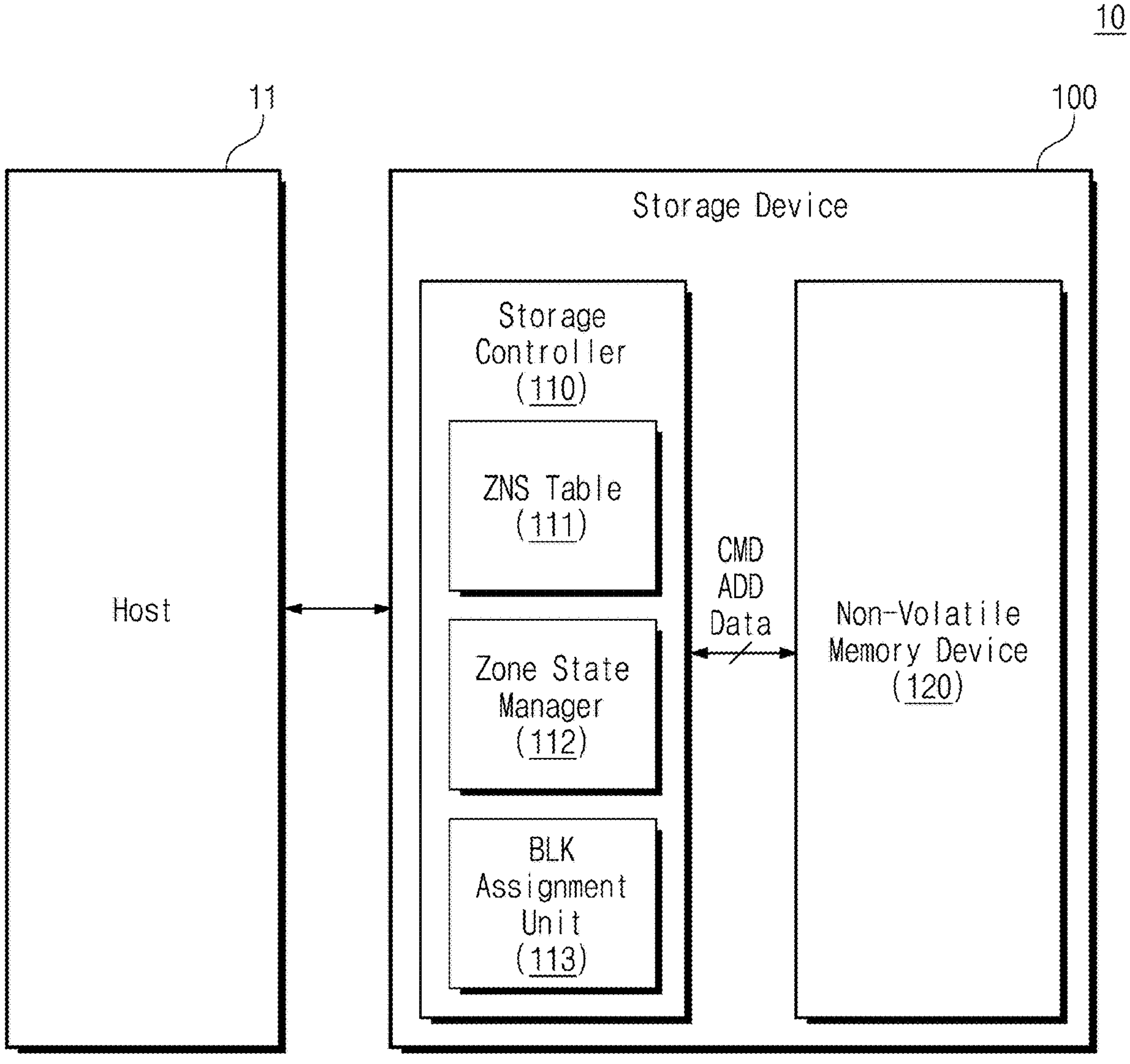
FIG. 1 is a block diagram of a storage system according to some example embodiments of the inventive concepts.

FIG. 1 is a block diagram of a storage system according to some example embodiments of the inventive concepts. Referring to FIG. 1, a storage system 10 may include a host 11 and/or a storage device 100. In some example embodiments, the storage system 10 may be a computing system, which is configured to process a variety of information, such as a personal computer (PC), a notebook, a laptop, a server, a workstation, a tablet PC, a smartphone, a digital camera, and/or a black box.

The host 11 may control an overall operation of the storage system 10. For example, the host 11 may store data in the storage device 100 and/or may read data stored in the storage device 100. For example, the host 11 may provide write data to the storage device 100, and/or the host 11 may request read data stored in the storage device 100.

The storage device 100 may include a storage controller 110 and/or a non-volatile memory device 120. The non-volatile memory device 120 may store data. The storage controller 110 may store data in the non-volatile memory device 120 and/or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 and/or may read the data stored in the non-volatile memory device 120.

In some example embodiments, the storage device 100 may assign corresponding memory blocks to a zone depending on a request of the host 11 and may sequentially store data in the assigned memory blocks. The zone may be conceptually referred to as some memory blocks physically continuous to each other from among a plurality of memory blocks. For example, the storage controller 110 and/or the non-volatile memory device 120 may support the zoned namespace (ZNS) standard of the non-volatile memory express (NVMe). The ZNS standard will be more fully described with reference to FIG. 4.

In some example embodiments, the non-volatile memory device 120 may be a NAND flash memory device, but the inventive concepts are not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), and/or a ferroelectric random access memory (FRAM).

The non-volatile memory device 120 may include a first-type memory block and/or a second-type memory block. In some example embodiments, the number of bits stored per cell of the first-type memory block may be 1. The number of bits stored per cell of the first-type memory block may be less than the number of bits stored per cell of the second-type memory block. A speed of a write operation for the first-type memory block may be high. The first-type memory block may be a memory block with high reliability.

In some example embodiments, the number of bits stored per cell of the second-type memory block may be 2 or more. A speed of a write operation for the second-type memory block may be low. The second-type memory block may be a block capable of efficiently storing a large amount of data.

For example, the first-type memory block may be implemented with a single level cell (SLC) storing one bit. The second-type memory block may be implemented with one of cells, which store a plurality of bits, such as a multi-level cell (MLC) storing 2 bits, a triple level cell storing 3 bits, and/or a quadruple level cell (QLC) storing 4 bits.

The storage controller 110 may include a ZNS table 111, a zone state manager 112, and/or a block assignment unit 113.

The ZNS table 111 may manage state information indicating a state of each or one or more of a plurality of zones and/or block assignment information indicating memory blocks assigned to each or one or more of the plurality of zones. For example, the zone state manager 112 and/or the block assignment unit 113 may manage the ZNS table 111.

Under control of the zone state manager 112, the ZNS table 111 may manage a plurality of state information indicating a state of each or one or more of the plurality of zones. When a state of a zone transitions depending on a host request, the zone state manager 112 may update the ZNS table 111 based on the transition of the zone state.

Under control of the block assignment unit 113, the ZNS table 111 may manage a plurality of block assignment information each indicating memory blocks assigned to each or one or more of the plurality of zones. In the event that a new memory block is assigned to the zone and/or when a previously assigned memory block is released from the zone, the block assignment unit 113 may update the ZNS table 111 based on the event.

When the storage device 100 is powered off, the ZNS table 111 may store the plurality of state information and/or the plurality of block assignment information in the non-volatile memory device 120.

The zone state manager 112 may receive requests complying with the ZNS standard from the host 11 and may process the requests complying with the ZNS standard. The zone state manager 112 may change a state of each or one or more of the plurality of zones depending on the request received from the host 11 and/or may update the state information of each or one or more zone stored in the Zone state manager 112.

The block assignment unit 113 may manage block assignment information indicating memory blocks assigned to a zone. Under control of the zone state manager 112, the block assignment unit 113 may manage a plurality of block assignment information each indicating memory blocks assigned to each or one or more of the plurality of zones.

For example, depending on the request of the zone state manager 112, the block assignment unit 113 may assign a memory block to a zone and/or may release the assignment of the memory block and may update block assignment information of each or one or more zone stored in the ZNS table 111.

Figure 2:
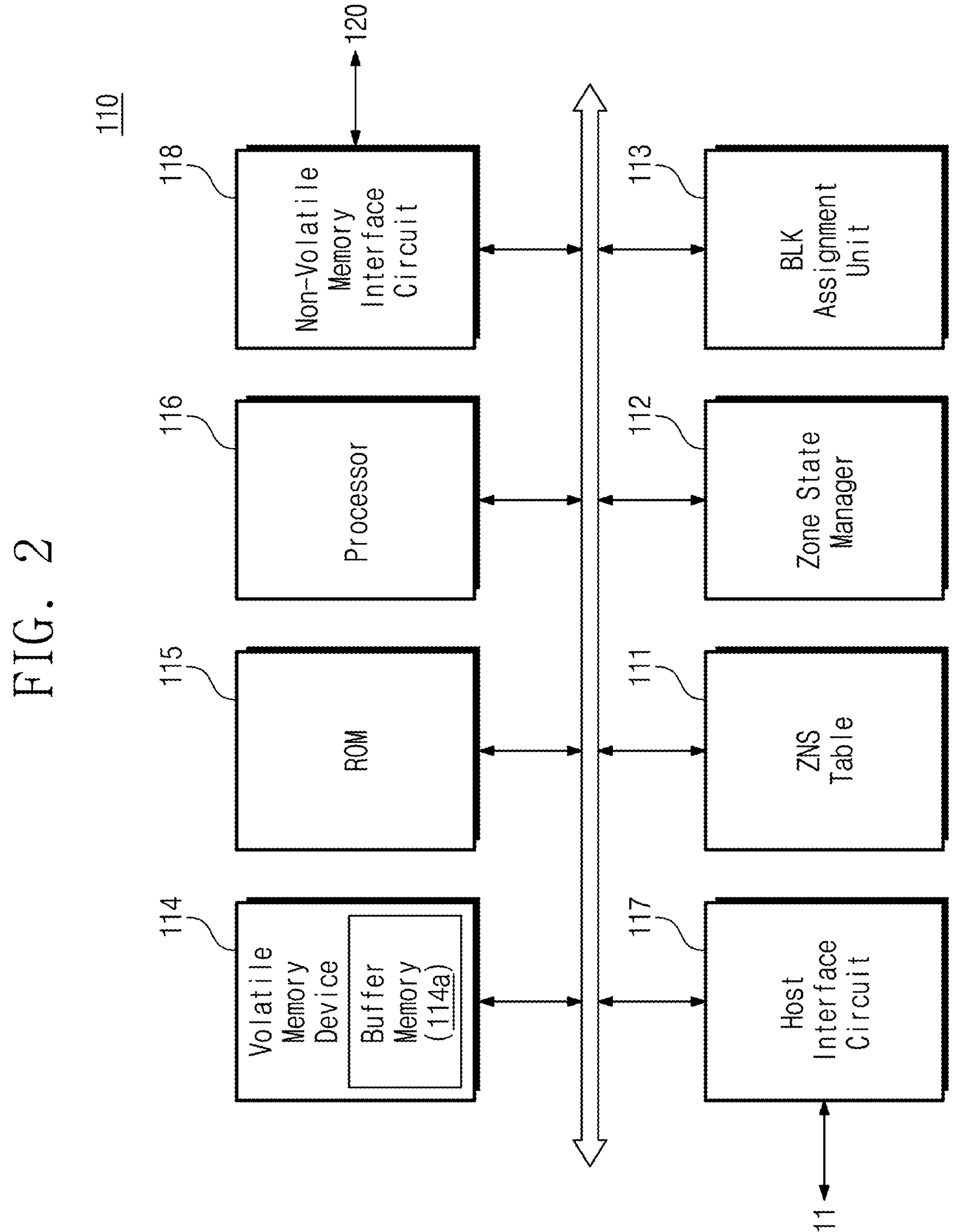
FIG. 2 is a block diagram illustrating a storage controller of FIG. 1 in detail, according to some example embodiments of the inventive concepts.

FIG. 2 is a block diagram illustrating a storage controller of FIG. 1 in detail, according to some example embodiments of the inventive concepts. Referring to FIGS. 1 and 2, the storage controller 110 may communicate with the host 11 and the non-volatile memory device 120.

The storage controller 110 may include the ZNS table 111, the zone state manager 112, the block assignment unit 113, a volatile memory device 114, a read only memory (ROM) 115, a processor 116, a host interface circuit 117, and/or a non-volatile memory interface circuit 118. The ZNS table 111, the zone state manager 112, and the block assignment unit 113 may respectively correspond to the ZNS table 111, the zone state manager 112, and the block assignment unit 113 of FIG. 1.

In some example embodiments, the ZNS table 111, the zone state manager 112, and/or the block assignment unit 113 may be implemented by firmware. For example, the non-volatile memory device 120 may store instructions corresponding to the ZNS table 111, the zone state manager 112, and/or the block assignment unit 113. The processor 116 may load the instructions of the non-volatile memory device 120 onto the volatile memory device 114. The processor 116 may execute the loaded instructions to operate the ZNS table 111, the zone state manager 112, and/or the block assignment unit 113.

The volatile memory device 114 may include a buffer memory 114*a*. The volatile memory device 114 may be used as a main memory, a cache memory, and/or a working memory of the storage controller 110, as well as the buffer memory 114*a*. For example, the volatile memory device 114 may be implemented with a static random access memory (SRAM) and/or a dynamic random access memory (DRAM).

The ROM 115 may be used as a read only memory that stores information necessary, or sufficient, for the operation of the storage controller 110. The processor 116 may control an overall operation of the storage controller 110.

The storage controller 110 may communicate with the host 11 through the host interface circuit 117. In some example embodiments, the host interface circuit 117 may be implemented based on at least one of various interfaces such as a serial ATA (SATA) interface, a peripheral component interconnect express (PCIe) interface, a serial attached SCSI (SAS), a nonvolatile memory express (NVMe) interface, and/or a universal flash storage (UFS) interface. Also, the host interface circuit 117 may support the ZNS standard of the NVMe.

The storage controller 110 may communicate with the non-volatile memory device 120 through the non-volatile memory interface circuit 118. In some example embodiments, the non-volatile memory interface circuit 118 may be implemented based on a NAND interface. Also, the non-volatile memory interface circuit 118 may support a sequential write operation that complies with the ZNS standard of the NVMe.

Figure 3:
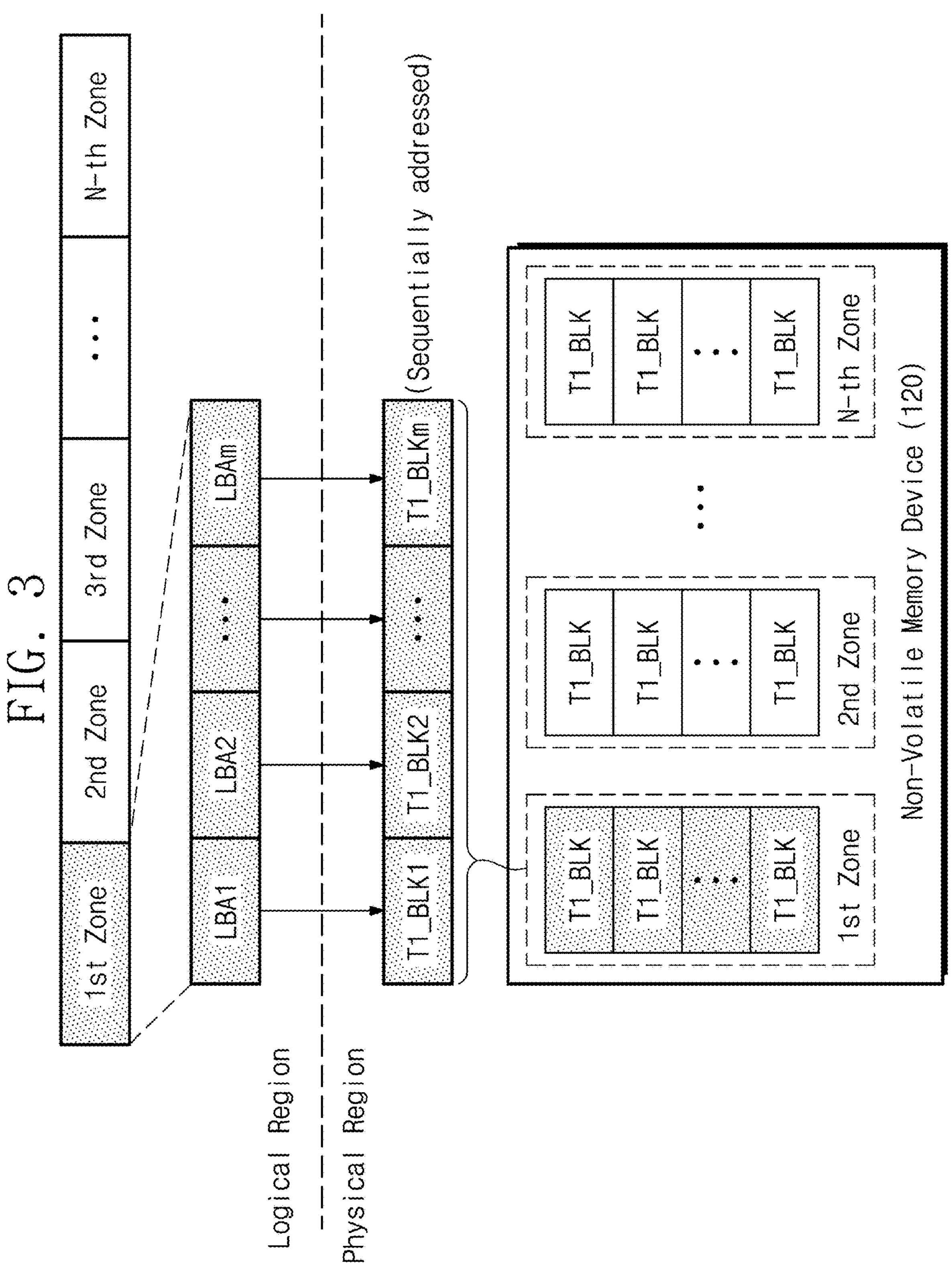
FIG. 3 is a diagram describing a sequential write operation according to some example embodiments of the inventive concepts.

FIG. 3 is a diagram describing a sequential write operation according to some example embodiments of the inventive concepts. An operation in which a storage controller sequentially writes data in the non-volatile memory device 120 will be described with reference to FIGS. 1 and 3.

A conventional storage controller may store data depending on a random access. For example, in the case where data are stored depending on the random access, memory blocks corresponding to logically sequential address blocks may be randomly distributed in a non-volatile memory device. The non-volatile memory device may be incapable of being overwritten in structure. In the case of performing the erase operation, the garbage collection operation in which data are read and are then copied to another memory block may be performed to individually manage valid data and invalid data in a memory block.

The conventional storage controller may frequently perform the garbage collection operation on the entire region of the non-volatile memory device, thereby reducing the lifetime of the non-volatile memory device (e.g., increasing the number of program/erase (P/E) cycles). Also, as a large over provisioning (OP) region is assigned for frequent garbage collection, wear leveling, and/or bad block management, an available storage capacity of the non-volatile memory device may be decreased.

According to some example embodiments of the inventive concepts, the storage controller 110 may perform the sequential write operation. For better understanding of the inventive concepts, a logical region of first to N-th zones and a physical region of first to N-th zones are illustrated together. Herein, "N" is an arbitrary natural number. The logical region may include addresses capable of being identified by the host 11. The physical region may include locations and/or addresses of memory blocks in the non-volatile memory device 120. The logical region and the physical region may have a mapping relationship.

Referring to the logical region, the storage controller 110 may manage the first to N-th zones. The first to N-th zones may be managed independently of each other. For example, the host 11 may execute a first application and/or a second application. The first application may manage data included in the first zone. The second application may manage data included in the second zone. That is, data having similar purposes and/or use periods from among the data managed by the same application may be managed within the same zone.

Each or one or more of the first to N-th zones may include a plurality of logical block addresses. For example, the first zone may include first to m-th logical block addresses LBA1 to LBAm. Herein, "m" is an arbitrary natural number. The first to m-th logical block addresses LBA1 to LBAm may be logically sequential.

The storage controller 110 may store data sequentially in the non-volatile memory device 120 by using a write pointer. For example, in the case where data corresponding to the first logical block address LBA1 and the second logical block address LBA2 are sequentially programmed in the non-volatile memory device 120 and the buffer memory 114*a* of the storage controller 110 stores data corresponding to the third logical block address LBA3, the write pointer may indicate the third logical block address LBA3.

Referring to the physical region, a non-volatile memory device 120 may include the plurality of blocks T1_BLK. The plurality of blocks T1_BLK may be classified into the first to N-th zones. The plurality of blocks T1_BLK of the first zone may be first to m-th blocks T1_BLK1 to T1_BLKm that are physically sequential. The first to m-th blocks T1_BLK1 to T1_BLKm of the first zone may respectively correspond to the first to m-th logical block addresses LBA1 to LBAm of the first zone. The storage controller 110 may allow data corresponding to the write request from the host 11 to be stored in the non-volatile memory device 120 logically and physically sequentially. That is, the storage controller 110 may support a sequential write operation.

For better understanding of the inventive concepts, the description is given as a logical block address corresponds to one block, but the inventive concepts are not limited thereto. Logical block addresses may respectively correspond to sequential sub-blocks in one block and/or sequential programming units (e.g., a unit by which memory cells are programmed), while maintaining the logical serializability. The correspondence relationship of the logical block address and the memory block may be variously changed and carried out by one skilled in the art.

As described above, according to some example embodiments of the inventive concepts, the storage controller 110 may manage data in units of zone, instead of managing data with respect to the entire region of the non-volatile memory device 120. As data management is made in units of zone, the I/O load and additional read and write operations due to garbage collection (GC) may decrease. Accordingly, a data processing speed of the storage device 100 may be improved, and the power consumption of the storage device 100 may decrease. Also, as the load due to the garbage collection decreases, the over provisioning (OP) region may be reduced. This may mean that an available storage capacity of the non-volatile memory device 120 increases.

FIG. 4 is a diagram describing states of a zone, according to some example embodiments of the inventive concepts. A state machine associated with zones of the storage device 100 according to the ZNS standard will be described with reference to FIGS. 1 and 4.

According to some example embodiments of the inventive concepts, zones that are managed by the storage device 100 may have one of a ZSE state, a ZSIO state, a ZSEO state, a ZSC state, and a ZSF state. As the storage device 100 processes a request received from the host 11, a state of a zone may transition.

The ZSE state and the ZSF state may be classified as a non-active state. The ZSIO state, the ZSEO state, and the ZSC state may be classified as an active state. Zones of the active state may be limited by a maximum active resources field. The ZSIO state and the ZSEO state may be classified as an open state. Zones of the open state may be limited by a maximum open resources field.

The ZSE state may indicate an empty state. In the ZSE state, data may not be yet stored in memory blocks, and the write pointer may indicate the lowest logical block address (e.g., a logical block address having the lowest number from among logical block addresses managed by a zone). The write pointer of the ZSE state may be valid. The ZSE state may transition to one of the ZSIO state, the ZSEO state, the ZSC state, and the ZSF state.

The ZSIO state may indicate an implicitly opened state. The ZSIO state may be a state implicitly opened by executing a write command received from the host 11. In the ZSIO state, a memory block may store data corresponding to the write command. The ZSIO state may transition to one of the ZSE state, the ZSEO state, the ZSC state, and the ZSF state. When an open resource is saturated, the ZSIO state may transition to the ZSC state even though there is no close command.

The ZSEO state may indicate an explicitly opened state. The ZSEO state may be a state explicitly opened by executing an open command received from the host 11. In the ZSEO state, a memory block may store data corresponding to a write command received subsequently. The ZSEO state may transition to one of the ZSE state, the ZSC state, and the ZSF state. The ZSEO state may have a higher priority to an open resource than the ZSIO state. The ZSEO state may transition to the ZSC state only by the close command.

The ZSC state may indicate a closed state. The transition to the ZSC state may be made 1) when, in the ZSE state, usable active resources are present and a set zone descriptor extension command is received, 2) when, in the ZSIO state, the close command is received or an open resource is saturated, or 3) when, in the ZSEO state, the close command is received. In the ZSC state, a memory block is incapable of storing data corresponding to the write command. The ZSC state may transition to one of the ZSE state, the ZSIO state, the ZSEO state, and the ZSF state.

The ZSF state may indicate a full state. In the ZSE state, memory blocks may be filled with data stored therein, and the write pointer may indicate the highest logical block address (e.g., a logical block address having the greatest number from among logical block addresses managed by a zone). The write pointer of the ZSF state may be invalid. The ZSF state may transition to the ZSE state by a reset zone command.

FIG. 5 is a diagram describing an operating method of a storage device of FIG. 1, according to some example embodiments of the inventive concepts. An operation in which a first-type memory block T1_BLK is assigned to a target zone of the storage device 100, that is, a memory block assignment operation is illustrated in FIG. 5, and the memory block assignment operation will be described with reference to FIGS. 1 and 5. The storage controller 110 and the non-volatile memory device 120 may respectively correspond to the storage controller 110 and the non-volatile memory device 120 of FIG. 1.

The storage controller 110 may include the ZNS table 111, the zone state manager 112, and/or the block assignment unit 113. The ZNS table 111, the zone state manager 112, and the block assignment unit 113 may respectively correspond to the ZNS table 111, the zone state manager 112, and the block assignment unit 113 of FIG. 1.

Referring to state information of the ZNS table 111 illustrated in FIG. 5, each or one or more of the first to fourth zones Z1 to Z4 may be in a full state. Also, referring to block assignment information of the ZNS table 111, a sixth block BLK6 may be assigned to the first zone Z1, a seventh block BLK7 may be assigned to the second zone Z2, an eighth block BLK8 may be assigned to the third zone Z3, and/or a ninth block BLK9 may be assigned to the fourth zone Z4.

Referring to the non-volatile memory device 120 illustrated in FIG. 5, first to tenth blocks BLK1 to BLK10 are illustrated. Each or one or more of the first to fifth blocks BLK1 to BLK5 may be the first-type memory block T1_BLK. Each or one or more of the sixth to tenth blocks BLK6 to BLK10 may be a second-type memory block T2_BLK.

According to some example embodiments of the inventive concepts, an operating method in which the storage device 100 assigns the first-type memory block T1_BLK to a target zone will be described below.

In a first operation ①, the zone state manager 112 may receive a first request RQ1 from the host 11. The first request RQ1 may include the command CMD and the address ADD. The command CMD may be an instruction for setting a state of the target zone to a first state. The first state may be the active state illustrated in FIG. 4. For example, the command CMD may be an instruction for allowing the state of the target zone to transition from the ZSE state to one of the ZSIO state, the ZSEO state, and the ZSC state.

The zone state manager 112 may determine the target zone of the plurality of zones, based on the address ADD. For example, the zone state manager 112 may determine a fifth zone Z5 as the target zone, based on the address ADD. The first request RQ1 may therefore be referred to as indicating the target zone.

In a second operation ②, the zone state manager 112 may update the state of the target zone based on the first request RQ1. The zone state manager 112 may update the state information of the ZNS table 111 based on the updated state.

For example, the zone state manager 112 may update the state of the fifth zone Z5 from the empty state to the active state, based on the first request RQ1.

In a third operation ③, the zone state manager 112 may request a block assignment operation from the block assignment unit 113. When the updated state of the target zone is the active state, the zone state manager 112 may request the block assignment unit 113 to assign the first-type memory block T1_BLK to the target zone.

In a fourth operation ④, the block assignment unit 113 may assign the first-type memory block T1_BLK to the target zone updated to the active state. The block assignment unit 113 may update block assignment information of the target zone.

For example, the block assignment unit 113 may assign the first block BLK1 being the first-type memory block T1_BLK to the fifth zone Z5. The block assignment unit 113 may update the block assignment information of the fifth zone Z5 of the ZNS table 111 such that "None" is changed to "BLK1".

In a fifth operation ⑤, the block assignment unit 113 may request the buffer memory 114*a* to perform the first request RQ1. In a sixth operation ⑥, the buffer memory 114*a* may store target data corresponding to the first request RQ1 in the first block BLK1 assigned to the fifth zone Z5.

Figure 6:
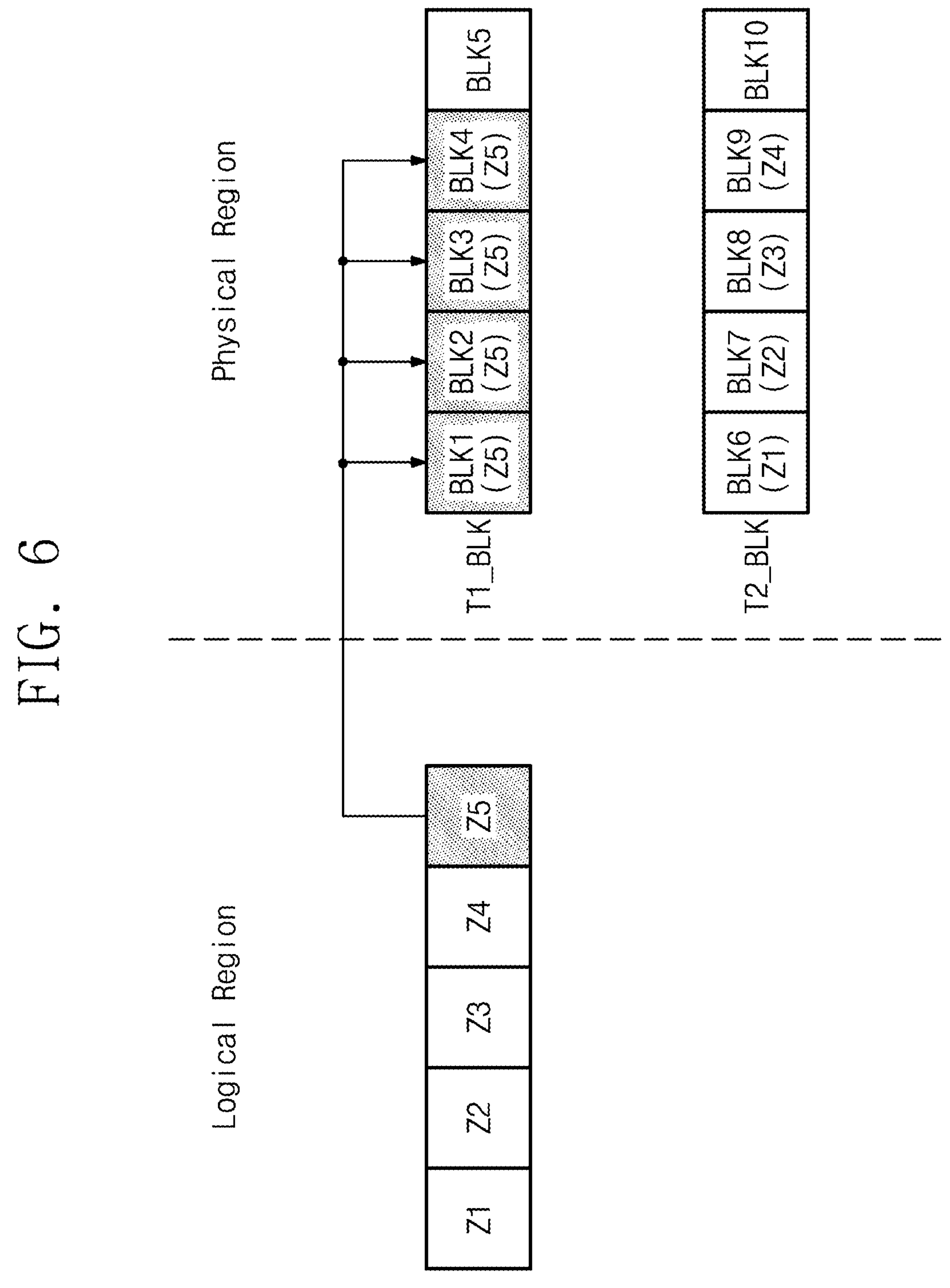
FIG. 6 is a diagram illustrating an operation of assigning a first-type memory block to a zone, according to some example embodiments of the inventive concepts.

FIG. 6 is a diagram illustrating an operation of assigning a first-type memory block to a zone, according to some example embodiments of the inventive concepts. A logical region and a physical region when a zone is updated to an active state are illustrated in FIG. 6.

Referring to the logical region, the first to fifth zones Z1 to Z5 are illustrated; referring to the physical region, the first to tenth blocks BLK1 to BLK10 are illustrated. Each or one or more of the first to fifth blocks BLK1 to BLK5 may be the first-type memory block T1_BLK. Each or one or more of the sixth to tenth blocks BLK6 to BLK10 may be a second-type memory block T2_BLK.

In some example embodiments, the number of memory blocks assigned to one zone may change depending on a type of a memory block. For example, when a memory block is an SLC memory block, 4 SLC memory blocks may be assigned to one zone. When a memory block is an MLC memory block, 2 MLC memory blocks may be assigned to one zone. When a memory block is a QLC memory block, one QLC memory block may be assigned to one zone.

In some example embodiments, when the first-type memory block T1_BLK is an SLC memory block, 4 first-type memory blocks T1_BLK may be assigned to one zone. That is, the first to fourth blocks BLK1 to BLK4 may be assigned to the fifth zone Z5. The write operation of the storage controller may be sequentially performed on the first to fourth blocks BLK1 to BLK4.

When the second-type memory block T2_BLK is a QLC memory block, one second-type memory block T2_BLK may be assigned to one zone. That is, the sixth block BLK6 may be assigned to the first zone Z1, the seventh block BLK7 may be assigned to the second zone Z2, the eighth block BLK8 may be assigned to the third zone Z3, and/or the ninth block BLK9 may be assigned to the fourth zone Z4.

Figure 7:
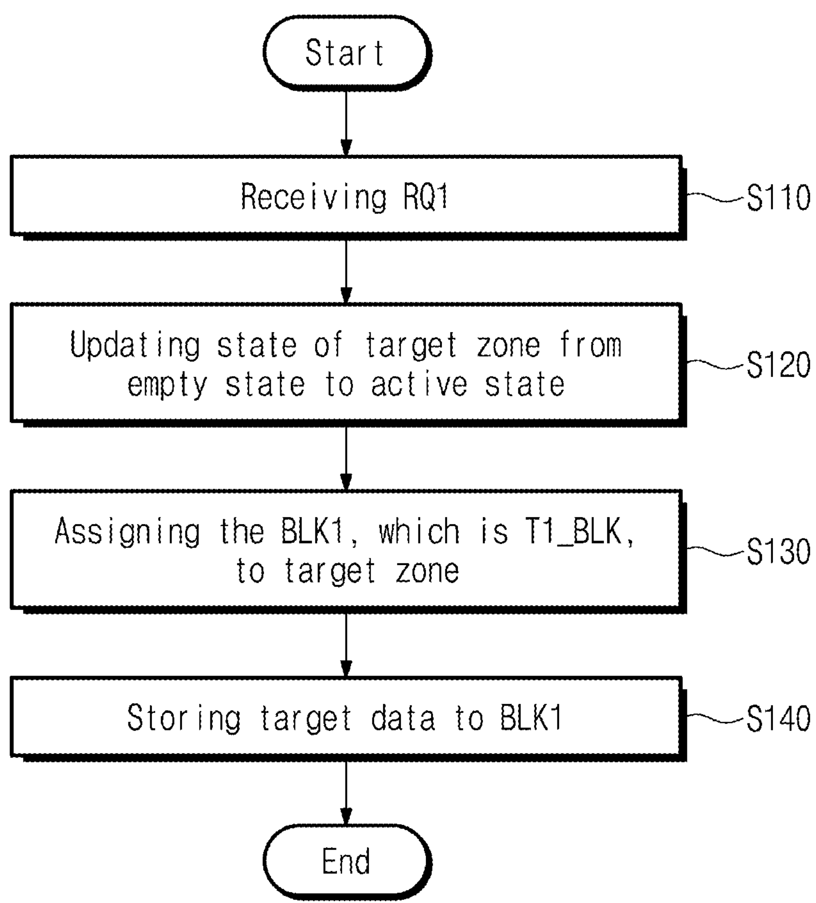
FIG. 7 is a flowchart illustrating an operation of assigning a first-type memory block to a zone, according to some example embodiments of the inventive concepts.

FIG. 7 is a flowchart illustrating an operation of assigning a first-type memory block to a zone, according to some example embodiments of the inventive concepts. An operation in which the storage controller 110 assigns a memory block to a zone updated to the active state will be described with reference to FIGS. 5 and 7. The storage controller 110 may correspond to the storage controller 110 of FIG. 5.

In operation S110, the storage controller 110 may receive the first request RQ1 from a host. The first request RQ1 may include the command CMD and the address ADD. The storage controller 110 may determine a zone (hereinafter referred to as a "target zone") targeted for an assignment operation, based on the address ADD. The first request RQ1 may therefore be referred to as indicating the target zone.

In operation S120, based on the first request RQ1, the storage controller 110 may update a state of the target zone from the empty state to the active state.

In operation S130, the storage controller 110 may assign the first-type memory block T1_BLK to the target zone updated to the active state. The storage controller 110 may assign the first block BLK1 being the first-type memory block T1_BLK to the target zone. For example, the first-type memory block T1_BLK may be an SLC memory block.

In some example embodiments, operation S130 may further include assigning, at the storage controller 110, the second to fourth blocks BLK2 to BLK4 being the first-type memory block T1_BLK to the target zone. The storage controller 110 may assign the first to fourth blocks BLK1 to BLK4 to the target zone.

In operation S140, the storage controller 110 may store data in the first-type memory block T1_BLK thus assigned. For example, the storage controller 110 may store data in the first block BLK1 being the first-type memory block T1_BLK.

In some example embodiments, when the storage controller 110 sequentially assigns the first to fourth blocks BLK1 to BLK4 being the first-type memory block T1_BLK to the target zone, operation S140 may include storing target data sequentially in the first to fourth blocks BLK1 to BLK4.

FIG. 8 is a diagram describing an operating method of a storage device of FIG. 1, according to some example embodiments of the inventive concepts. An operation in which the second-type memory block T2_BLK is assigned to a target zone of the storage device 100, that is, a memory block assignment operation is illustrated in FIG. 8, and the memory block assignment operation will be described with reference to FIGS. 1 and 8.

The storage controller 110 and the non-volatile memory device 120 may respectively correspond to the storage controller 110 and the non-volatile memory device 120 of FIG. 1.

The storage controller 110 may include the ZNS table 111, the zone state manager 112, and/or the block assignment unit 113. The ZNS table 111, the zone state manager 112, and the block assignment unit 113 may respectively correspond to the ZNS table 111, the zone state manager 112, and the block assignment unit 113 of FIG. 1.

In some example embodiments, the operating method of the storage device 100 illustrated in FIG. 8 may be performed after the operating method of the storage device 100 illustrated in FIG. 5. That is, depending on the first request RQ1, the storage controller 110 may assign the first-type memory block T1_BLK to a target zone and may store the target data in the first-type memory block T1_BLK thus assigned; then, the storage controller 110 may receive a second request RQ2 from the host 11.

According to some example embodiments of the inventive concepts, an operating method in which the storage device 100 assigns the second-type memory block T2_BLK to a target zone after the first-type memory block T1_BLK is assigned to the target zone will be described below.

In a first operation ①, the zone state manager 112 may receive the second request RQ2 from the host 11. The second request RQ2 may include the command CMD and the address ADD. The command CMD may be an instruction for updating a state of a target zone from the active state to the full state. The full state may be the full state illustrated in FIG. 4. For example, the command CMD may be an instruction for allowing at least one of the ZSIO state, the ZSEO state, and the ZSC state to transition to the ZSF state.

The zone state manager 112 may determine the target zone of the plurality of zones, based on the address ADD. For example, the zone state manager 112 may determine the fifth zone Z5 as the target zone, based on the address ADD. The second request RQ2 may therefore be referred to as indicating the target zone.

In a second operation ②, the zone state manager 112 may update the state of the target zone based on the second request RQ2. The zone state manager 112 may update the state information of the ZNS table 111 based on the updated state. For example, the zone state manager 112 may change the state of the fifth zone Z5 from the empty state to the full state, based on the second request RQ2.

In a third operation ③, the zone state manager 112 may request the block assignment operation from the block assignment unit 113. When the updated state of the target zone is the full state, the zone state manager 112 may request the block assignment unit 113 to assign the second-type memory block T2_BLK to the target zone.

In a fourth operation ④, the block assignment unit 113 may assign the second-type memory block T2_BLK to the target zone updated to the full state. In some example embodiments, the block assignment unit 113 may determine a memory block to be assigned to the target zone from among the plurality of memory blocks being the second-type memory block T2_BLK with reference to the ZNS table 111.

For example, the block assignment unit 113 may check the block assignment information of the first to fourth zones Z1 to Z4 with reference to the ZNS table 111. The block assignment unit 113 may assign the tenth block BLK10, which is physically sequential to the ninth block BLK9, to the fifth zone Z5, based on the sixth to ninth blocks BLK6 to BLK9 are respectively assigned to the first to fourth zones Z1 to Z4.

The block assignment unit 113 may update the block assignment information of the target zone in the ZNS table 111.

For example, the block assignment unit 113 may assign the tenth block BLK10 being the second-type memory block T2_BLK to the fifth zone Z5. The block assignment unit 113 may update the block assignment information of the fifth zone Z5 in the ZNS table 111 such that "BLK1" is changed to "BLK10".

In a fifth operation ⑤, the block assignment unit 113 may request the buffer memory 114*a* to perform the second request RQ2. In a sixth operation ⑥, the buffer memory 114*a* may move the target data stored in the first block BLK1 to the tenth block BLK10. In some example embodiments, the buffer memory 114*a* may copy the target data stored in the first block BLK1 to the tenth block BLK10. The block assignment unit 113 may discard the first block BLK1 after copying the target data stored in the first block BLK1 to the tenth block BLK10.

As described above, the reliability of the write operation of the storage device 100 may be guaranteed, or increased, by managing the write-completed data in the second-type memory block T2_BLK being a high-capacity memory block and managing data under write processing in the first-type memory block T1_BLK being a high-reliability memory block. Also, the storage device 100 may efficiently manage a large amount of data.

Some example embodiments in which the storage controller 110 stores the target data in the first-type memory block T1_BLK assigned to the target zone depending on the first request RQ1 and then updates a state of the target zone to a full state based on that the storage controller 110 receives the second request RQ2 from the host 11 are described with reference to FIG. 8, but the inventive concepts are not limited thereto.

In some example embodiments, when the buffer memory 114*a* stores the target data in the first-type memory block T1_BLK assigned to the target zone depending on the first request RQ1, the block assignment unit 113 may determine whether an available capacity is present in the first-type memory block T1_BLK assigned to the target zone.

When it is determined that the available capacity is absent from the first-type memory block T1_BLK assigned to the target zone, the block assignment unit 113 may assign the second-type memory block T2_BLK to the target zone. The block assignment unit 113 may request the buffer memory 114*a* to move the target data stored in the first-type memory block T1_BLK to the second-type memory block T2_BLK.

For example, when the buffer memory 114*a* stores the target data in the first to fourth blocks BLK1 to BLK4 assigned to the target zone depending on the first request RQ1, the block assignment unit 113 may determine whether an available capacity is present in the first to fourth blocks BLK1 to BLK4. When it is determined that the available capacity is absent from the first to fourth blocks BLK1 to BLK4, the block assignment unit 113 may assign the tenth block BLK10 to the target zone. The block assignment unit 113 may request the buffer memory 114*a* to move the target data stored in the first to fourth blocks BLK1 to BLK4 to the tenth block BLK10.

As described above, after the write operation is completed, the storage device 100 may move data stored in the first-type memory block T1_BLK with high reliability to the second-type memory block T2_BLK with low reliability. That is, as the storage device 100 guarantees the write operation in a memory block with high reliability, even though a power-off occurs, it may be possible to perform a recovery operation with a small amount of resource. As the storage device 100 efficiently uses a resource, the performance of the storage device 100 may be improved.

Figure 9:
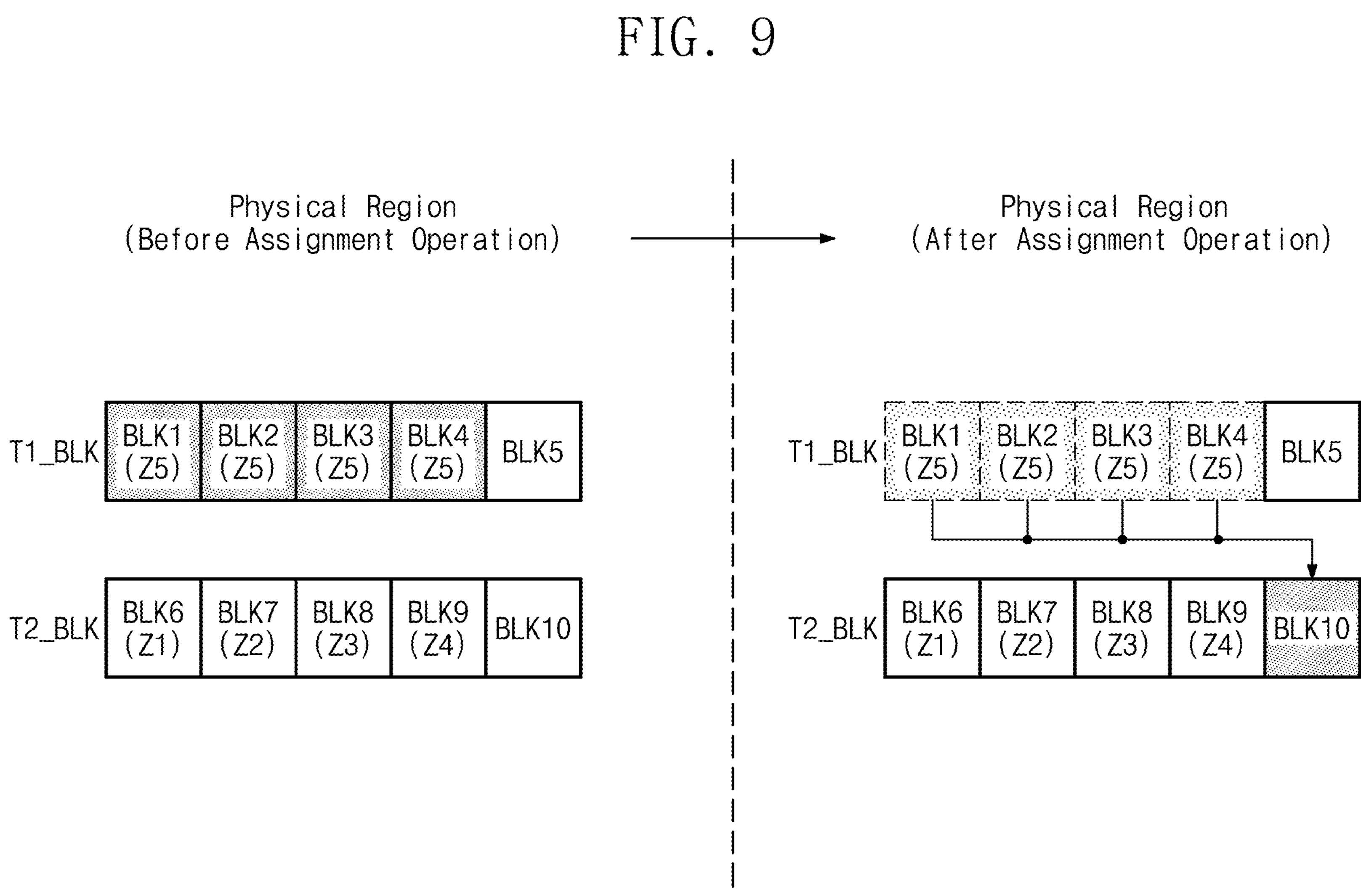
FIG. 9 is a diagram illustrating an operation of assigning a second-type memory block to a zone, according to some example embodiments of the inventive concepts.

FIG. 9 is a diagram illustrating an operation of assigning a second-type memory block to a zone, according to some example embodiments of the inventive concepts. A physical region when a zone is in a full state is illustrated in FIG. 9.

Referring to the physical region before the storage controller 110 performs the block assignment operation depending on the second request RQ2, the first to fourth blocks BLK1 to BLK4 may be assigned to the fifth zone Z5, the sixth block BLK6 may be assigned to the first zone Z1, the seventh block BLK7 may be assigned to the second zone Z2, the eighth block BLK8 may be assigned to the third zone Z3, and/or the ninth block BLK9 may be assigned to the fourth zone Z4.

Referring to the physical region after the storage controller 110 performs the block assignment operation depending on the second request RQ2, the tenth block BLK10 may be assigned to the fifth zone Z5. In some example embodiments, when the first-type memory block T1_BLK is a SLC memory block and the second-type memory block T2_BLK is an QLC memory block, target data stored in the first to fourth blocks BLK1 to BLK4 may be sequentially moved to the tenth block BLK10.

Figure 10:
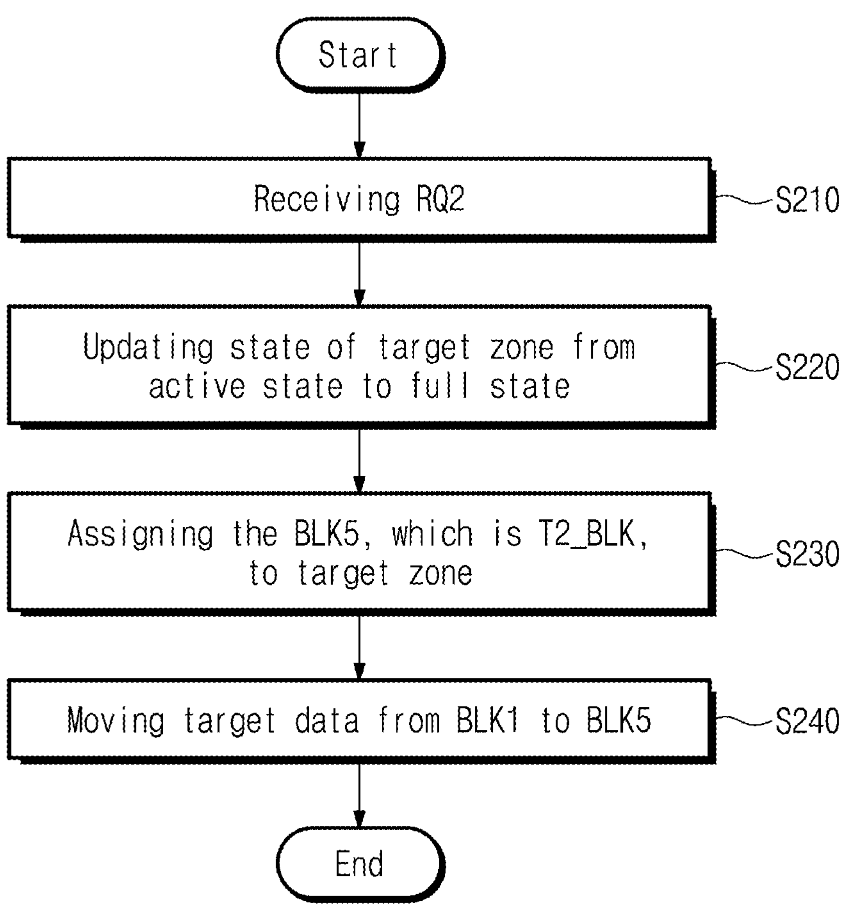
FIG. 10 is a flowchart illustrating an operation of assigning a second-type memory block to a zone, according to some example embodiments of the inventive concepts.

FIG. 10 is a flowchart illustrating an operation of assigning a second-type memory block to a zone, according to some example embodiments of the inventive concepts. An operation in which the storage controller 110 assigns a memory block to a zone updated to the full state will be described with reference to FIGS. 8 and 10. The storage controller 110 may correspond to the storage controller 110 of FIG. 8.

In operation S210, the storage controller 110 may receive the second request RQ2 from a host. The second request RQ2 may include the command CMD and the address ADD. The storage controller 110 may determine a zone (hereinafter referred to as a "target zone") targeted for an assignment operation, based on the address ADD. The second request RQ2 may therefore be referred to as indicating the target zone.

In operation S220, based on the second request RQ2, the storage controller 110 may update a state of the target zone from the active state to the full state.

In operation S230, the storage controller 110 may assign the second-type memory block T2_BLK to the target zone updated to the full state. The storage controller 110 may assign the tenth block BLK10 being the second-type memory block T2_BLK to the target zone. For example, the second-type memory block T2_BLK may be a QLC memory block.

In operation S240, the storage controller 110 may move data stored in the first-type memory block T1_BLK to the second-type memory block T2_BLK thus assigned. The storage controller 110 may move the data stored in the first block BLK1 to the tenth block BLK10.

In some example embodiments, operation S240 may include discarding, at the storage controller 110, the first-type memory block T1_BLK after moving the data stored in the first-type memory block T1_BLK to the second-type memory block T2_BLK. For example, after the storage controller 110 moves the data stored in the first block BLK1 to the tenth block BLK10, the storage controller 110 may discard the first block BLK1.

FIG. 11 is a diagram describing an operating method of a storage device of FIG. 1, according to some example embodiments of the inventive concepts. A memory block de-assignment operation of a storage device will be described with reference to FIGS. 1 and 11. The storage controller 110 and the non-volatile memory device 120 may respectively correspond to the storage controller 110 and the non-volatile memory device 120 of FIG. 1.

The storage controller 110 may include the ZNS table 111, the zone state manager 112, and/or the block assignment unit 113. The ZNS table 111, the zone state manager 112, and the block assignment unit 113 may respectively correspond to the ZNS table 111, the zone state manager 112, and the block assignment unit 113 of FIG. 1.

In some example embodiments, the operating method of the storage device 100 illustrated in FIG. 11 may be performed after the operating method of the storage device 100 illustrated in FIG. 5. That is, depending on the first request RQ1, the storage controller 110 may assign the first-type memory block T1_BLK to a target zone and may store the target data in the first-type memory block T1_BLK thus assigned; then, the storage controller 110 may receive a third request RQ3 from the host 11.

According to some example embodiments of the inventive concepts, an operating method in which the storage device 100 assigns the first-type memory block T1_BLK to a target zone and then de-assigns the first-type memory block T1_BLK assigned to the target zone will be described below.

In a first operation ①, the zone state manager 112 may receive the third request RQ3 from the host 11. The third request RQ3 may include the command CMD and the address ADD. The command CMD may be an instruction for allowing a state of the target zone to transition to the empty state. The empty state may be the empty state illustrated in FIG. 4. For example, the command CMD may be an instruction for allowing at least one of the ZSIO state, the ZSEO state, and the ZSC state to transition to the ZSE state.

The zone state manager 112 may determine the target zone of the plurality of zones, based on the address ADD. For example, the zone state manager 112 may determine the fifth zone Z5 as the target zone, based on the address ADD. The third request RQ3 may therefore be referred to as indicating the target zone.

In a second operation ②, the zone state manager 112 may update the state of the target zone based on the third request RQ3. The zone state manager 112 may update the state information of the ZNS table 111 based on the updated state. For example, the zone state manager 112 may update the state of the fifth zone Z5 from the active state to the empty state, based on the third request RQ3.

In a third operation ③, the zone state manager 112 may request the block assignment operation from the block assignment unit 113. When the updated state of the target zone is the empty state, the zone state manager 112 may request the block assignment unit 113 to de-assign the first-type memory block T1_BLK assigned to the target zone.

In a fourth operation ④, the block assignment unit 113 may de-assign the first-type memory block T1_BLK assigned to the target zone updated to the empty state. The block assignment unit 113 may update block assignment information of the target zone.

For example, the block assignment unit 113 may de-assign the first block BLK1 assigned to the fifth zone Z5. The block assignment unit 113 may update the block assignment information of the fifth zone Z5 in the ZNS table 111 so as to be changed to "None" from the first block BLK1.

In a fifth operation ⑤, the block assignment unit 113 may request the buffer memory 114*a* to perform the third request RQ3. In a sixth operation ⑥, the buffer memory 114*a* may delete the data stored in the first block BLK1.

Figure 12:
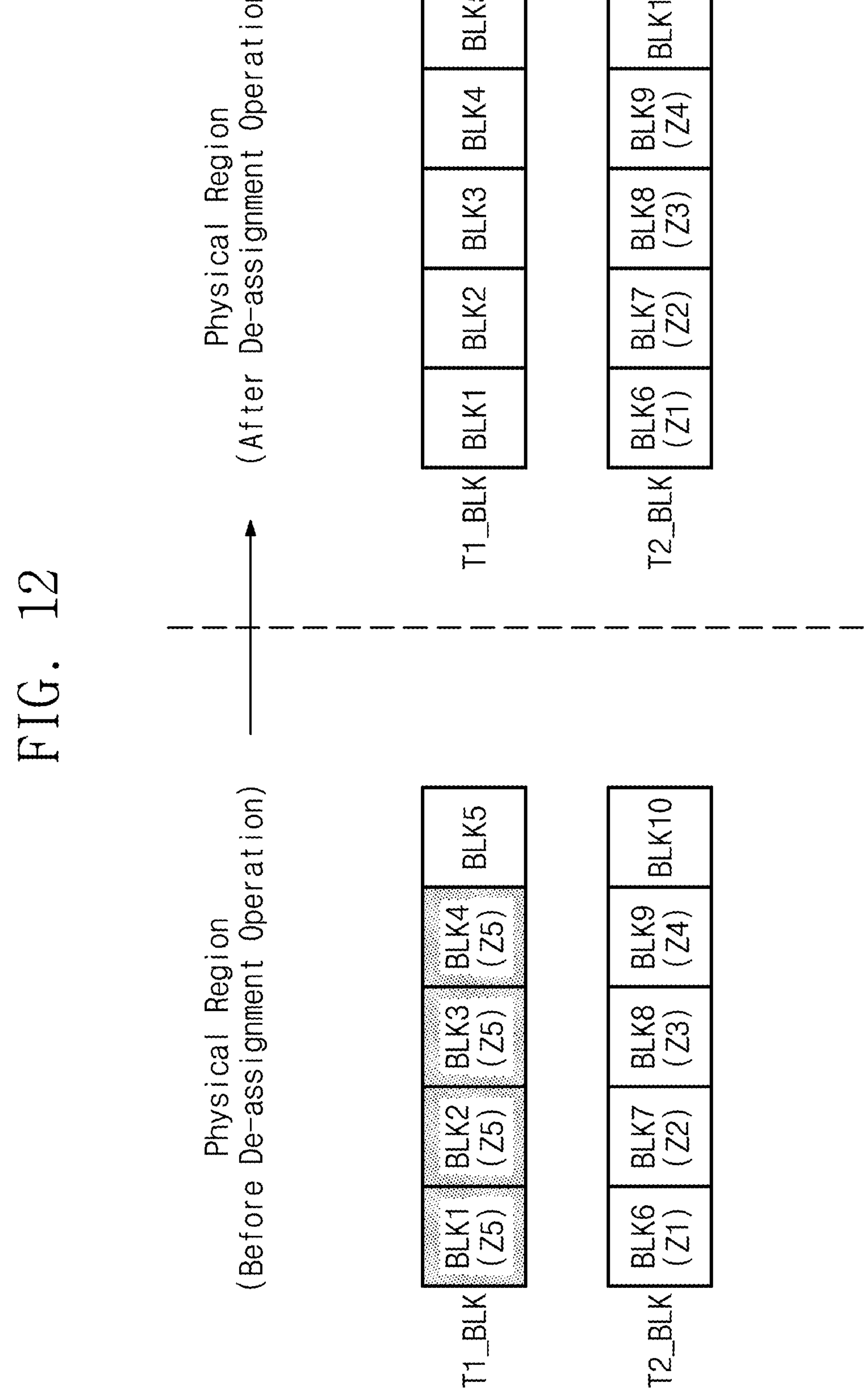
FIG. 12 is a diagram describing an operation of de-assigning a memory block assigned to a zone, according to some example embodiments of the inventive concepts.

FIG. 12 is a diagram describing an operation of de-assigning a memory block assigned to a zone, according to some example embodiments of the inventive concepts. A physical region when a zone is in an empty state is illustrated in FIG. 12.

Referring to the physical region before the storage controller 110 performs a block de-assignment operation depending on the third request RQ3, the first to fourth blocks BLK1 to BLK4 may be assigned to the fifth zone Z5, the sixth block BLK6 may be assigned to the first zone Z1, the seventh block BLK7 may be assigned to the second zone Z2, the eighth block BLK8 may be assigned to the third zone Z3, and/or the ninth block BLK9 may be assigned to the fourth zone Z4.

Referring to the physical region after the storage controller 110 performs the block de-assignment operation depending on the third request RQ3, the storage controller 110 may release the assignment of the first to fourth blocks BLK1 to BLK4 from the fifth zone Z5. After the assignment of the first to fourth blocks BLK1 to BLK4 is released from the fifth zone Z5, the storage controller 110 may delete data stored in the first to fourth blocks BLK1 to BLK4.

Figure 13:
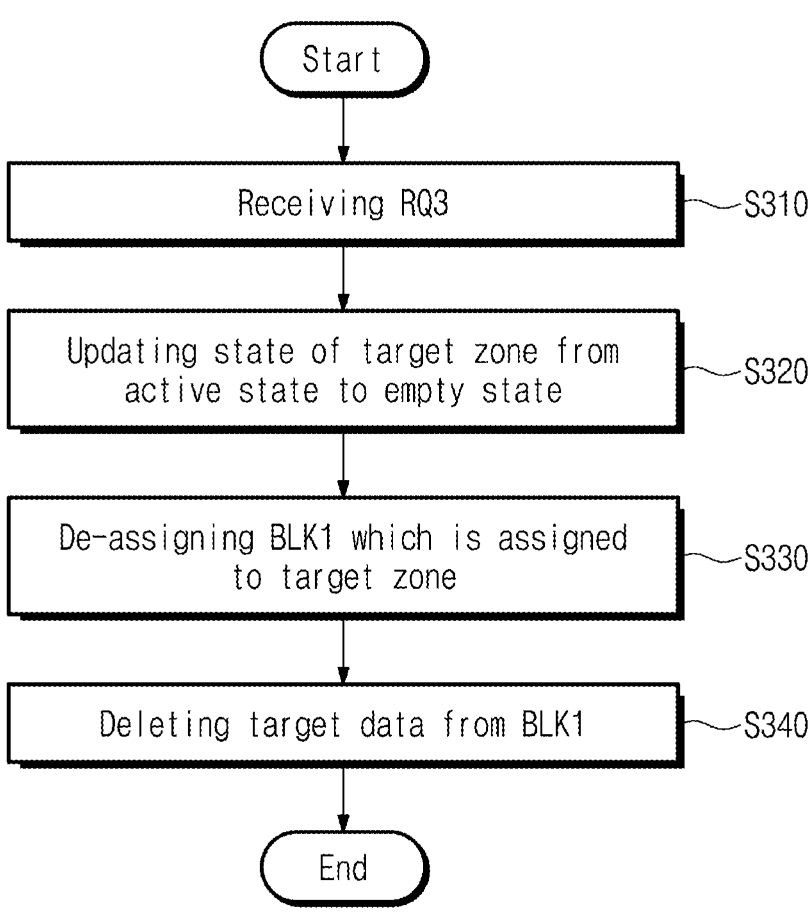
FIG. 13 is a flowchart describing an operation of de-assigning a memory block assigned to a zone, according to some example embodiments of the inventive concepts.

FIG. 13 is a flowchart describing an operation of de-assigning a memory block assigned to a zone, according to some example embodiments of the inventive concepts. An operation in which the storage controller 110 de-assigns a memory block assigned to a zone updated to the empty state will be described with reference to FIGS. 11 and 13. The storage controller 110 may correspond to the storage controller 110 of FIG. 11.

In operation S310, the storage controller 110 may receive the third request RQ3 from a host. The third request RQ3 may include the command CMD and the address ADD. The storage controller 110 may determine a zone (hereinafter referred to as a "target zone") targeted for an assignment operation, based on the address ADD. The third request RQ3 may therefore be referred to as indicating the target zone.

In operation S320, based on the third request RQ3, the storage controller 110 may update a state of the target zone from the active state to the empty state.

In operation S330, the storage controller 110 may de-assign the first-type memory block T1_BLK assigned to the target zone. For example, the storage controller 110 may de-assign the first to fourth blocks BLK1 to BLK4 assigned to the fifth zone Z5.

In operation S340, the storage controller 110 may delete data stored in the first-type memory block T1_BLK thus de-assigned. For example, the storage controller 110 may delete the data stored in the first to fourth blocks BLK1 to BLK4.

Figure 14:
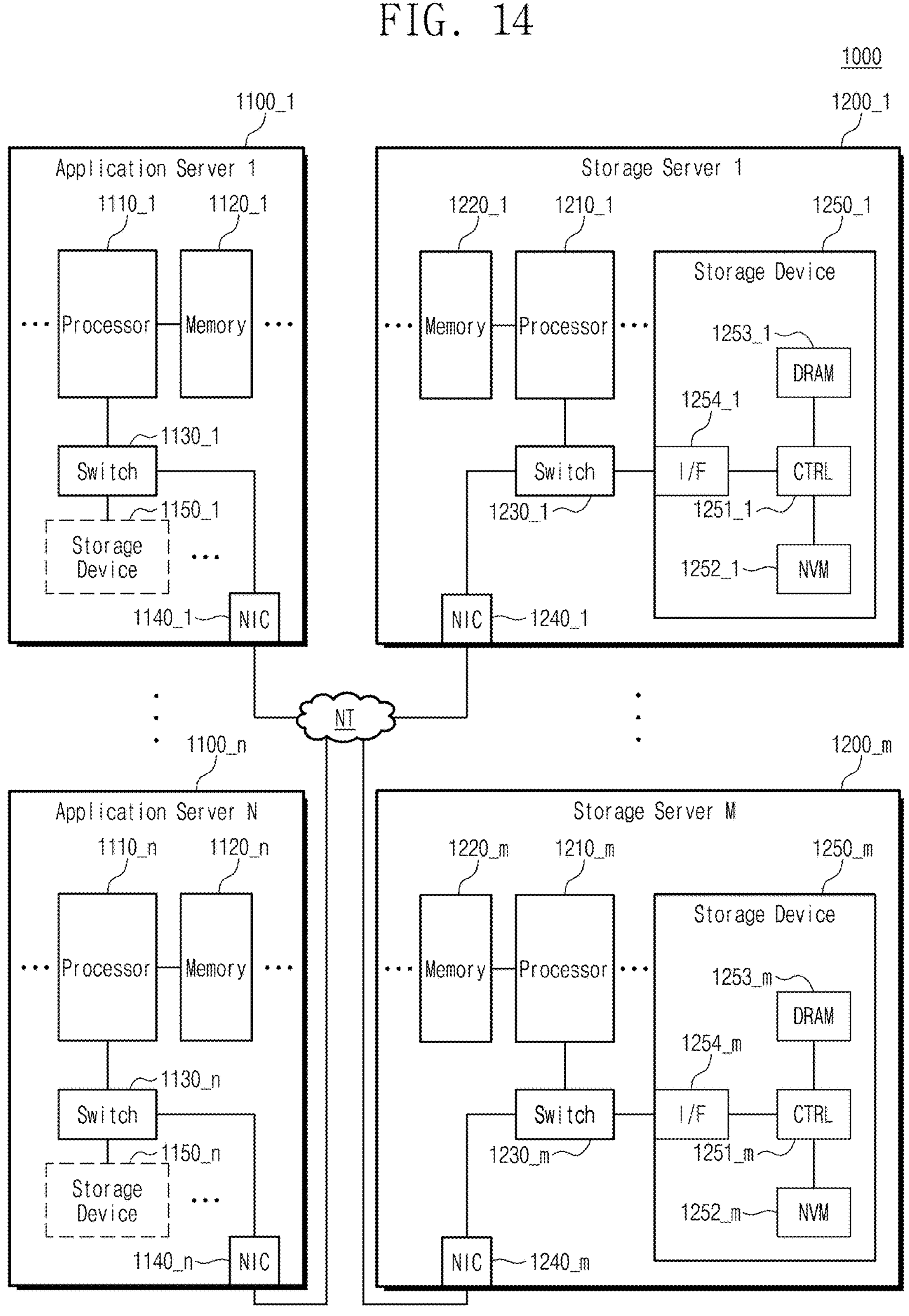
FIG. 14 is a block diagram illustrating a data center to which a storage device according to some example embodiments of the inventive concepts is applied.

Referring to FIG. 14, the data center 1000 may be a facility that collects various types of pieces of data and provides services. The data center 1000 may be referred to as a data storage center. The data center 1000 may be a system for operating a search engine and/or a database, and may be a computing system used by companies, such as banks, and/or government agencies. The data center 1000 may include application servers 1100_1 to 1100_*n* and/or storage servers 1200_1 to 1200 *m*. The number of application servers 1100_1 to 1100_*n* and/or the number of storage servers 1200_1 to 1200_*m* may be variously selected according to some example embodiments. The number of application servers 1100_1 to 1100_*n* may be different from the number of storage servers 1200 to 1200_*m*.

Hereinafter, for convenience of description, an example of the storage server 1200_1 is described. Each or one or more of the remaining storage servers 1200_2 to 1200_*m* and/or the plurality of application servers 1100_1 to 1100_*n* may have a structure similar to that of the storage server 1200_1.

The storage server 1200_1 may include a processor 1210_1, a memory 1220_1, a switch 1230_1, a network interface connector (NIC) 1240_1, and/or a storage device 1250_1. The processor 1210_1 may control all, or one or more, operations of the storage server 1200_1, access the memory 1220_1, and/or execute instructions and/or data loaded in the memory 1220_1. The memory 1220_1 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM).

In some example embodiments, the numbers of processors 1210_1 and/or memories 1220_1 included in the storage server 1200_1 may be variously selected. In some example embodiments, the processor 1210_1 and the memory 1220_1 may provide a processor-memory pair. In some example embodiments, the number of processors 1210_1 may be different from the number of memories 1220_1. The processor 1210_1 may include a single-core processor or a multi-core processor.

The switch 1230_1 may selectively connect the processor 1210_1 to the storage device 1250_1 and/or selectively connect the NIC 1240_1 to the storage device 1250_1 via the control of the processor 1210_1.

In some example embodiments, the NIC 1240_1 may include a network interface card and/or a network adaptor. The NIC 1240_1 may be connected to the network NT by a wired interface, a wireless interface, a Bluetooth interface, and/or an optical interface. The NIC 1240_1 may include an internal memory, a digital signal processor (DSP), and/or a host bus interface and be connected to the processor 1210_1 and/or the switch 1230_1 through the host bus interface. The host bus interface may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. In some example embodiments, the NIC 1240_1 may be integrated with at least one of the processor 1210_1, the switch 1230_1, and/or the storage device 1250_1.

The storage device 1250_1 may store data and/or output stored data under the control of the processor 1210_1. The storage device 1250_1 may include a controller 1251_1, a nonvolatile memory 1252_1, a DRAM 1253_1, and/or an interface 1254_1. In some example embodiments, the storage device 1250_1 may be implemented as a ZNS SSD.

The controller 1251_1 may control general operations of the storage device 1250_1. In some example embodiments, the controller 1250_1 assigns the first type memory block or the second type memory block of the nonvolatile memory 1252_1 to the target zone or de-assigns the memory block assigned to the target zone, according to the updated state of the target zone.

DRAM 1253_1 may temporarily store (or buffer) data to be written to the NAND flash memory device 1252_1 and/or data read from the NAND flash memory device 1252_1. The DRAM 1253_1 may be configured to store various data (e.g., metadata, mapping data, etc.) required, or sufficient, for the controller 1251_1 to operate. The interface 1254_1 may provide a physical connection between the processor 1210_1, the switch 1230_1, and/or the NIC 1240_1 and the controller 1251_1. In some example embodiments, the interface 1254_1 may be implemented in a DAS (Direct Attached Storage) method for directly connecting the storage device 1250_1 with a dedicated cable. In some example embodiments, the interface 1254_1 may be configured based on at least one of the various interfaces described above through the host interface bus.

Configurations of the above-described storage server 1200_1 are provided as an example, and the scope of the inventive concepts is not limited thereto. The above-described configurations of the storage server 1200_1 may be applied to other storage servers or each or one or more of a plurality of application servers. In some example embodiments, in each or one or more of the plurality of application servers 1100_1 to 1100_*n*, the storage device 1150_1 may be selectively omitted.

The application servers 1100_1 to 1100_*n* may communicate with the storage servers 1200_1 to 1200_*m* through a network NT. The network NT may be implemented by using a fiber channel (FC) and/or Ethernet. In this case, the FC may be a medium used for relatively high-speed data transmission and use an optical switch with high performance and high availability. The storage servers 1200 to 1200_*m* may be provided as file storages, block storages, and/or object storages according to an access method of the network NT.

In some example embodiments, the network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In some example embodiments, the network NT may be a general network, such as a TCP/IP network. For example, the network NT may be implemented according to a protocol, such as FC over Ethernet (FCoE), network attached storage (NAS), and/or NVMe over Fabrics (NVMe-oF).

In some example embodiments, at least one of the plurality of application servers (1100_1~**1100_*n*) may be configured to access at least another one of the plurality of application servers 1100_1 to 1100_*n* and/or at least one of the plurality of storage servers 1200_1 to 1200_*m*** through the network NT.

The application server 1100_1 may store data, which is requested by a user or a client to be stored, in one of the storage servers 1200_1 to **1200_*m* through the network NT. Also, the application server 1100_1 may obtain data, which is requested by the user or the client to be read, from one of the storage servers 1200_1 to 1200_*m* through the network NT. For example, the application server 1100_1** may be implemented as a web server and/or a database management system (DBMS).

The application server 1100_1 may access a memory **1120_*n* and/or a storage device 1150_*n*, which is included in another application server 1100_*n*, through the network NT. Alternatively, the processor 1110_1 of the application server 1100_1 may access the memory 1220_1 and/or the storage device 1250_1 of the storage server 1200_1 through the network NT. Thus, the application server 1100_1 may perform various operations on data stored in application servers 1100_1 to 1100_*n* and/or the storage servers 1200_1 to 1200_*m*. For example, the application server 1100_1 may execute an instruction for moving and/or copying data between the application servers 1100 to 1100_*n* and/or the storage servers 1200_1 to 1200_*m*. In this case, the data may be moved from the storage devices 1250_1 to 1250_*m* of the storage servers 1200_1 to 1200_*m* to the memories 1120_1 to 1120_*n* of the application servers 1100_1 to 1100_*n* directly or through the memories 1220_1 to 1220_*m* of the storage servers 1200 to 1200_*m***. The data moved through the network NT may be data encrypted for security and/or privacy.

In some example embodiments, each or one or more of the storage devices 1150_1 to **1150_*n* and 1250_1 to 1250_*m* may be the storage device described with reference to FIGS. 1 to 13 and may be configured to perform various block assignment operations and various block de-assignment operations. As described above, depending on an updated state of a target zone, the storage devices 1150_1 to 1150_*n* and 1250_1 to 1250_*m*** may assign a first-type memory block or a second-type memory block to the target zone or may de-assign the memory block assigned to the target zone.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments of the inventive concepts, a storage controller managing different types of blocks, an operating method thereof, and an operating method of a storage device including the same are provided. Also, as a storage controller manages write-completed data in a high-capacity memory block and manages data under write processing in a high-reliability memory block, the storage controller guarantees, or increases, the reliability of the write operation and efficiently manages a large amount of data.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. An operating method of a storage controller which communicates with a host and a non-volatile memory (NVM) device, the method comprising:

receiving a first request from the host, the first request including an address indicating a first zone of a plurality of zones of a zoned namespace (ZNS) of a non-volatile memory of the non-volatile memory device, and a command to transition to an implicitly opened (ZSIO) state or an explicitly opened (ZSEO) state of the ZNS;

setting a state of the first zone from an empty state with no assigned memory blocks to an active state in response to the first request;

assigning a first memory block of a plurality of memory blocks of the non-volatile memory device to the first zone updated to the active state; and storing user data corresponding to the first request in the first memory block, wherein the first memory block is higher in reliability than a second memory block assigned to a second zone having a non-active state from among the plurality of zones.

2. The method of claim 1, further comprising:

after storing the user data in the first memory block, receiving a second request indicating the first zone from the host;

setting the state of the first zone to a full state in response to the second request;

assigning the second memory block to the first zone updated to the full state; and copying the user data stored in the first memory block to the second memory block.

3. The method of claim 2, further comprising:

discarding the first memory block in response to copying the user data of the first memory block in the first zone to the second memory block.

4. The method of claim 1, further comprising:

receiving, from the host, a second request indicating the first zone after storing the user data in the first memory block;

setting the state of the first zone to the empty state in response to the second request;

de-assigning the first memory block assigned to the first zone; and deleting the user data stored in the first memory block.

5. The method of claim 1, wherein the assigning the first memory block includes:

assigning a third memory block, a fourth memory block, and a fifth memory block of the plurality of memory blocks to the first zone.

6. The method of claim 5, wherein a number of data bits to be stored per cell of each of the first memory block, the third memory block, the fourth memory block, and the fifth memory block is less than a number of data bits to be stored per cell of the second memory block.

7. The method of claim 6, wherein each of the first memory block, the third memory block, the fourth memory block, and the fifth memory block is a single level cell (SLC) memory block, and the second memory block is a quadruple level cell (QLC) memory block.

8. The method of claim 5, wherein the storing the user data includes:

storing the user data sequentially in the first memory block, the third memory block, the fourth memory block, and the fifth memory block.

9. The method of claim 7, further comprising:

determining whether an available capacity is present in the first memory block, the third memory block, the fourth memory block, and the fifth memory block after storing the user data sequentially in the first memory block, the third memory block, the fourth memory block, and the fifth memory block;

assigning the second memory block to the first zone in response to determining that the available capacity is absent from the first memory block, the third memory block, the fourth memory block, and the fifth memory block; and copying the user data stored in the first memory block, the third memory block, the fourth memory block, and the fifth memory block sequentially to the second memory block.

10. The method of claim 1, wherein the active state includes the ZSIO state, the ZSEO state, or a close (ZSC) state of the ZNS, and wherein the non-active state indicates the empty (ZSE) state of the ZNS.

11. A storage controller comprising:

processing circuitry configured to change a state of a target zone of a plurality of zones of a zoned namespace (ZNS) depending on a request of a host, the request including an address indicating the target zone, and a command to transition from an empty state with no assigned memory blocks to an implicitly opened (ZSIO) state or an explicitly opened (ZSEO) state of the ZNS, assign a first memory block of a plurality of memory blocks in a non-volatile memory device to the target zone in response to the changed state of the target zone being an active state; and a buffer memory configured to store target data corresponding to the request of the host in the first memory block, wherein the first memory block is higher in reliability than a second memory block assigned to a zone having a non-active state from among the plurality of zones.

12. The storage controller of claim 11, wherein the processing circuitry is further configured to:

assign the second memory block to the target zone in response to the changed state of the target zone being a full state, and wherein the buffer memory is further configured to:

copy the target data stored in the first memory block to the second memory block.

13. The storage controller of claim 11, wherein the processing circuitry is further configured to:

de-assign the first memory block assigned to the target zone in response to the changed state of the target zone being the empty state, and wherein the buffer memory is further configured to:

delete the target data stored in the first memory block.

14. The storage controller of claim 11, wherein the processing circuitry is further configured to:

assign a third memory block, a fourth memory block, and a fifth memory block of the plurality of memory blocks to the target zone in response to the changed state of the target zone being the active state.

15. The storage controller of claim 14, wherein a number of data bits to be stored per cell of each of the first memory block, the third memory block, the fourth memory block, and the fifth memory block is less than a number of data bits to be stored per cell of the second memory block.

16. The storage controller of claim 15, wherein each of the first memory block, the third memory block, the fourth memory block, and the fifth memory block is a single level cell (SLC) memory block, and the second memory block is a quadruple level cell (QLC) memory block.

17. The storage controller of claim 11, wherein the processing circuitry is further configured to:

manage, via a zone table, state information of each of the plurality of zones and a plurality of block assignment information each indicating blocks assigned to each of the plurality of zones.

18. An operating method of a storage device which communicates with a host, the method comprising, receiving a first request from the host, the first request including an address indicating a first zone of a plurality of zones of a zoned namespace (ZNS), and a command to transition to an implicitly opened (ZSIO) state or an explicitly opened (ZSEO) state of the ZNS;

setting a state of the first zone from an empty state with no assigned memory blocks to an active state in response to the first request;

assigning a first memory block of a plurality of memory blocks of a non-volatile memory device to the first zone updated to the active state; and storing user data corresponding to the first request in the first memory block, wherein the first memory block is higher in reliability than a second memory block assigned to a second zone having a non-active state from among the plurality of zones.

19. The method of claim 18, further comprising:

receiving, from the host, a second request indicating the first zone after storing the user data in the first memory block;

setting the state of the first zone to a full state in response to the second request;

assigning the second memory block to the first zone updated to the full state; and copying the user data stored in the first memory block to the second memory block.

20. The method of claim 1, wherein a first zone of the ZNS including the first memory block includes more assigned memory blocks than a second zone of the ZNS including the second memory block.

* * * * *